US005862458A

United States Patent [19]
Ishii

[11] Patent Number: 5,862,458
[45] Date of Patent: Jan. 19, 1999

[54] IMPEDANCE MATCHING CIRCUIT IN TRANSMITTER CIRCUIT AND CONTROL METHOD THEREOF

[75] Inventor: Junichi Ishii, Tokyo, Japan

[73] Assignee: NEC Corporation, Tokyo, Japan

[21] Appl. No.: 633,374

[22] Filed: Apr. 17, 1996

[30] Foreign Application Priority Data

Apr. 18, 1995 [JP] Japan .................................... 7-092431

[51] Int. Cl.[6] .................................................... H04B 1/04
[52] U.S. Cl. .......................... 455/107; 455/121; 455/129
[58] Field of Search .............................. 455/91, 107, 115, 455/116, 117, 119, 120, 121, 123, 124, 125, 129; 333/17.1, 17.3

[56] References Cited

U.S. PATENT DOCUMENTS

| | | | |
|---|---|---|---|
| 3,643,163 | 2/1972 | Bruck ...................................... | 455/129 |
| 4,493,112 | 1/1985 | Bruene ..................................... | 455/129 |
| 5,483,680 | 1/1996 | Talbot ..................................... | 455/129 |
| 5,525,940 | 6/1996 | Heikkila et al. ........................ | 455/125 |
| 5,564,086 | 10/1996 | Cygan et al. ............................ | 455/123 |

FOREIGN PATENT DOCUMENTS 60-145712  8/1985  Japan .

Primary Examiner—Thanh-Cong Le
Attorney, Agent, or Firm—Whitham, Curtis & Whitham

[57] ABSTRACT

In an impedance matching circuit used in a transmitter circuit, an occurrence of a reflection wave in an antenna is suppressed. The impedance matching circuit in a transmitter circuit includes a modulating circuit for modulating an input signal to output a modulation signal, a power amplifying circuit for power-amplifying the modulation signal, an antenna for outputting the signal power-amplified by the power amplifying circuit, a demodulating circuit for demodulating the signal power-amplified by the power amplifying circuit to output a demodulation signal, a band-outside-component detecting circuit for detecting a band-outside-component of the demodulation signal, a control circuit for outputting a control signal based upon the signal derived from the band-outside-component detecting circuit, and an impedance matching circuit for matching an input impedance of the antenna with an impedance of the power amplifying circuit by changing an impedance of the impedance matching circuit based upon the control signal.

20 Claims, 7 Drawing Sheets

IMPEDANCE MATCHING CIRCUIT IN TRANSMITTER CIRCUIT AND CONTROL METHOD THEREOF

BACKGROUND OF THE INVENTION

The present invention generally relates to an impedance matching circuit and a control method thereof. More specifically, the present invention is directed to an impedance matching circuit containing a power amplifying circuit for amplifying a modulation signal in a linear manner, and also to a method for controlling this impedance matching circuit.

Conventionally, this sort of impedance matching circuit is applied to a transmitter circuit for transmitting a transmit signal. This transmitter circuit includes a modulating circuit for modulating an input signal to output a modulation signal, a power amplifying circuit for power-amplifying this modulation signal in a linear manner to output a power-amplified modulation signal, and an antenna for transmitting this power-amplified modulation signal.

The input impedance of the antenna connected to the power amplifying circuit would be varied due to disturbances such as a change in ambient temperatures, an aging change, or direct touch of a human body to the antenna. As a result, electromagnetic waves (transmit signals) would be reflected at the input terminal of the antenna and then the reflection waves would be input to the power amplifying circuit. When high power reflection waves are input to the power amplifying circuit, there are some risks that this power amplifying circuit would be electrically destroyed.

To solve this problem, one solution has been proposed in, for instance, Japanese Laid-open Patent Application No. 60-145712 opened in 1985 as the control signal detecting circuit for protecting the power amplifier.

In this detecting circuit, the traveling wave and the reflection wave of the power-amplified modulation signal is sensed by the directional coupler provided between the power amplifier and the antenna. Then, the sensed traveling wave and reflection wave are detected by the respective detectors. Thus, two sets of power of the detected signals are compared with each other by the DC amplifier, so that the power ratio between them is outputted. The power ratio is inputted into the level adjusting unit and then, the gain of the power amplifier is so controlled as to be decreased when the ratio of the reflection wave's power value to the traveling wave's power value is larger than a preselected value. When the power value of the reflection wave is larger than this preselected value, since it is so controlled that the gain of the power amplifier is lowered, the power value of the reflection wave is also reduced, so that the electrical destruction of this power amplifier may be prevented.

However, although this detecting circuit may lower the gain of the power amplifier when the ratio of the reflection wave's power value to the traveling wave's power value is larger than a preselected value to thereby reduce the power value of the reflection wave, this detecting circuit can not suppress occurrences of the reflection waves per se.

Even if the power value of the reflection wave is low and this reflection wave is input to the power amplifying circuit for long time, this power amplifying circuit would be electrically destroyed.

In such a case that the linear power amplification by the power amplifying circuit is required, for instance, in the case that the AM (amplitude-modulated) signal is power-amplified, the reflection wave is inputted from the antenna, so that this AM signal could not be power-amplified in the linear region. When the AM signal is power-amplified by the power amplifying circuit in the nonlinear region, the resultant signal could not be correctly demodulated at the transmission counter party.

Furthermore, this detecting circuit has such a problem that since the gain of the power amplifier is reduced so as to lower the power of the reflection waves, the input signal could not be continuously power-amplified by the power amplifier at a constant gain.

SUMMARY OF THE INVENTION

An object of the present invention is to provide an impedance matching circuit in a transmitter circuit for suppressing an occurrence of a reflection wave at an antenna, and also a method for controlling the impedance matching circuit.

Another object of the present invention is to provide a control apparatus for providing an impedance matching circuit between a power amplifying circuit and an antenna, and an output impedance of the power amplifying circuit is matched with an input impedance of the antenna, and also to provide a control method thereof.

To achieve the above-describe objects, a control apparatus, according to the present invention, is comprised of: a modulating circuit for modulating an input signal to output a modulation signal; a power amplifying circuit for power-amplifying the modulation signal; an antenna for outputting the signal power-amplified by the power amplifying circuit; a demodulating circuit for demodulating the signal power-amplified by the power amplifying circuit to output a demodulation signal; a band-outside-component detecting circuit for detecting a band-outside-component of the demodulation signal; a control circuit for outputting a control signal based upon the signal derived from the band-outside-component detecting circuit; and an impedance matching circuit for matching an input impedance of the antenna with an impedance of the power amplifying circuit by changing an impedance of the impedance matching circuit based upon the control signal.

Also, in order to achieve the above-described objects, a control method of the present invention has a method for modulating an input signal by a modulating circuit, a method for power-amplifying the modulated signal by a power amplifying circuit, and a method for transmitting the power-amplified signal. This control method is comprised of the steps of: demodulating the power-amplified signal; detecting a band-outside-component of the demodulated signal; outputting a control signal based upon the detected band-outside-component; and matching an input impedance of the antenna with an impedance of the power amplifying circuit by changing an impedance based upon said control signal.

In such an arrangement, in the case that the reflection wave happens to occur in the antenna, if the power amplifying circuit power-amplifies the modulation signal in the nonlinear region, then the band-outside-component detecting circuit detects the broadened band-outside component of the signal demodulated in the demodulating circuit. Since the control circuit controls the impedance matching circuit in such a manner that the input impedance of the antenna is matched with the output impedance of the power amplifying circuit based upon the detected broadened band-outside component, it is possible to suppress the occurrence of the reflection wave at the antenna.

Accordingly, the power amplifying circuit can power-amplify the modulation signal within the linear region at a constant gain without being electrically destroyed.

BRIEF DESCRIPTION OF THE DRAWINGS

These and other objects, features and advantages of the invention will become more fully apparent from the following detailed description taken in conjunction with the accompanying drawings, in which.

DETAILED DESCRIPTION OF THE PREFERRED EMBODIMENTS

Figure 1:
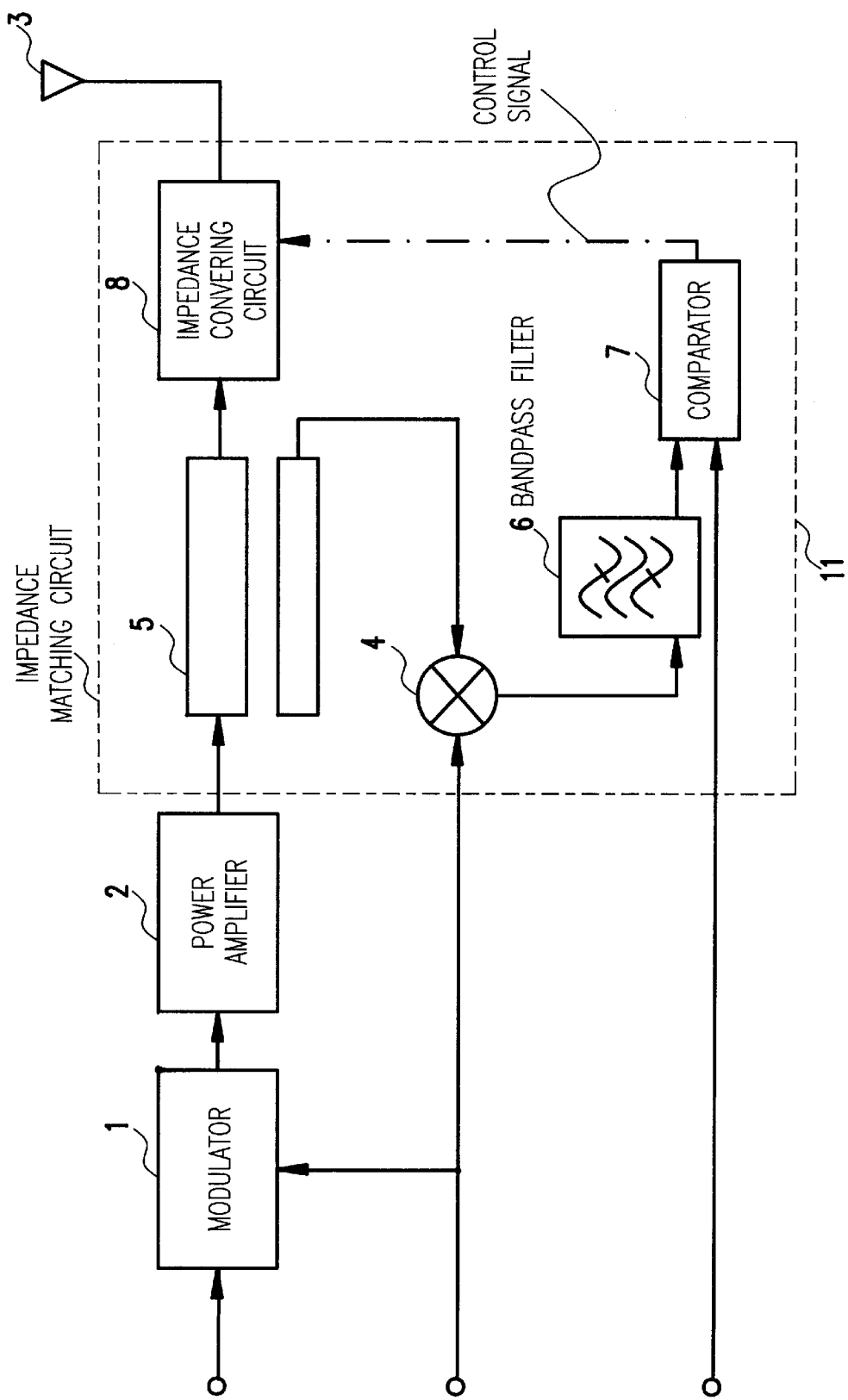
FIG. 1 is a functional block diagram for representing an example of a transmitter circuit.

In FIG. 1, a transmitter circuit includes a modulating circuit 1, a power amplifying circuit 2, an impedance matching circuit 12, and an antenna 3.

The modulating circuit 1 outputs a modulation signal produced by modulating a local signal with a baseband signal to the power amplifying circuit 2. The power amplifying circuit 2 power-amplifies the modulation signal derived from the modulating circuit to output the power-amplified signal. A directional coupling circuit 5 detects a traveling wave of the power-amplified signal derived from the power amplifying circuit 2. The impedance converting circuit 8 changes an impedance based upon a control signal derived from a power comparing circuit 7. The antenna 3 transmits the entered power-amplified signal through the directional coupling circuit 5 and the impedance converting circuit 8.

A frequency mixing circuit 4 demodulates the traveling wave derived from the directional coupling circuit 5 by the local signal to obtain a demodulation signal which will be outputted. A band-pass filter 6 filters the demodulation signal to supply a filtered signal to a power comparing circuit 7. The power comparing circuit 7 compares a power value of the filtered signal from the band-pass filter 6 with a power value indicative of a preselected threshold value signal. When the power value of the filtered signal derived from the band-pass filter 6 is higher than the power value representative of the threshold value signal, the power comparing circuit 7 outputs to the impedance converting circuit 8, a control signal indicative of a difference between the power value of the filtered signal from the band-pass filter 6 and the power value indicative of the threshold value.

Figure 2:
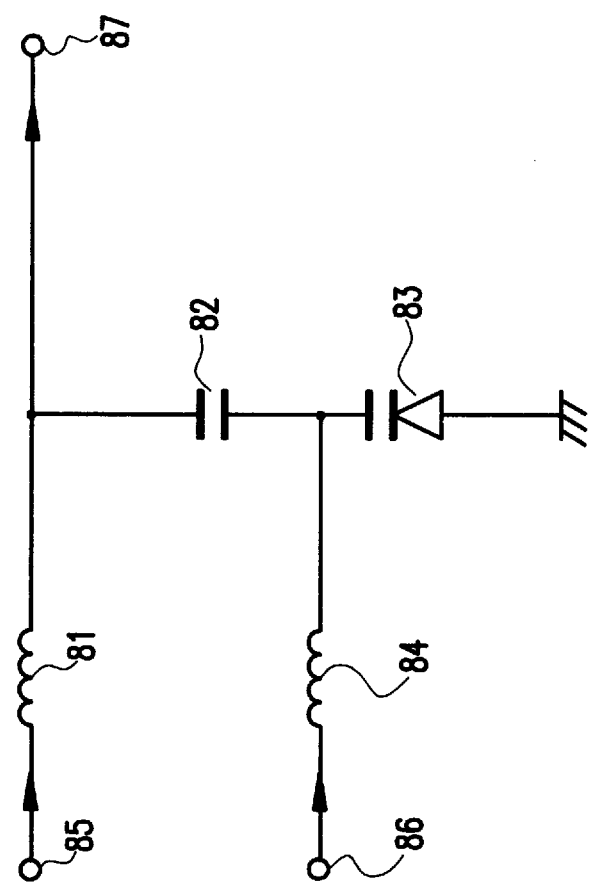
FIG. 2 is a circuit diagram of an impedance converting circuit shown in FIG. 1.

Referring now to FIG. 2, an internal circuit of the impedance converting circuit 8 will be explained.

In FIG. 2, the impedance converting circuit 8 is constructed of a terminal 85 for inputting therein a signal supplied from the directional coupling circuit 5, and a coil 81 whose one end is connected to the terminal 85. Another terminal 87 is connected to the other end of this coil 81, and the signal entered from the power amplifying circuit 2 via the directional coupling circuit 5 into this impedance converting circuit 8 is outputted via this terminal 87 to the antenna 3.

A capacitor 82 and a variable capacitance diode 83 are series-connected between the ground and a junction point between the coil 81 and the terminal 87. Another coil 84 is connected between another junction point between the capacitor 82 and the variable capacitance diode 83, and another terminal 86 into which the control signal is inputted.

In such an impedance converting circuit 8, since the variable capacitance diode 83 is constructed of, e.g., a varicap, the capacitance is varied in response to the voltage value of the control signal, so that the impedance of the impedance converting circuit 8 is varied, which is defined by the combined impedance of the capacitor 82 and the variable capacitance diode 83.

Next, an internal circuit of the power comparing circuit 7 will now be described with reference to FIG. 3.

Figure 3:
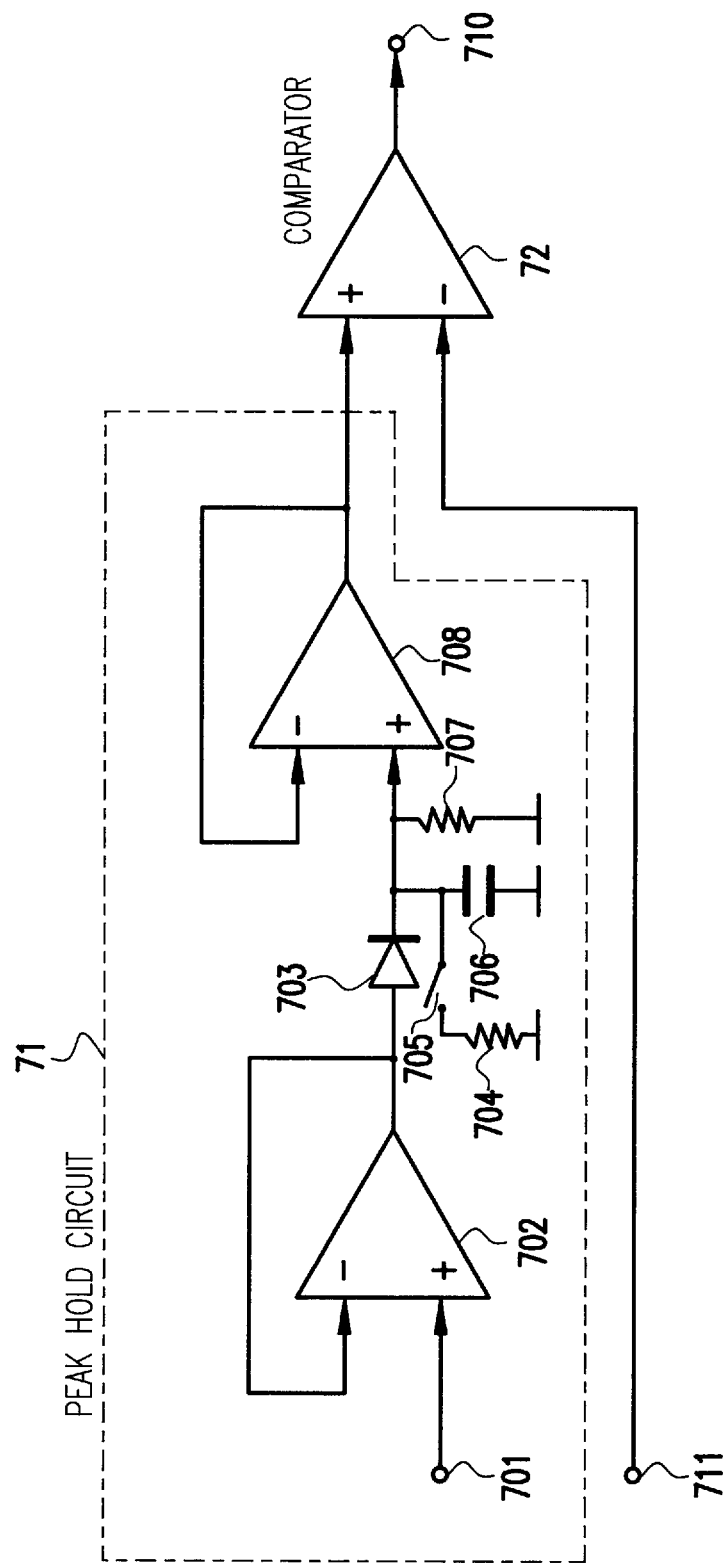
FIG. 3 is a circuit diagram of a power comparing circuit shown in FIG. 1.

In FIG. 3, the power comparing circuit 7 includes a peak hold circuit 71 and a comparator 72.

In the peak hold circuit 71, a terminal 701 into which the signal derived from the band-pass filter 6 is inputted is connected to a positive (+) polarity terminal of an operational amplifier 702. An output from this operational amplifier 702 is fed back to a negative (−) polarity terminal thereof and connected to a positive polarity terminal of a diode 703. A negative polarity terminal of the diode 703 is connected to a positive polarity terminal of another operational amplifier 708. A capacitor 706 and a resistor 707 are parallel-connected between the ground and a junction point between the negative polarity terminal of the diode 703 and the positive polarity terminal of the operational amplifier 708. A switch 705 and a resistor 704 are series-connected to a junction point between the negative polarity terminal of the diode 703 and the capacitor 706, and this resistor 704 is grounded. The output of the operational amplifier circuit 708 is fed back to the negative polarity terminal thereof, and also is entered into the positive polarity terminal of the comparator 72.

In the comparator 72, a predetermined threshold value signal derived from a terminal 711 is inputted into the positive polarity terminal thereof. Then, the signal supplied from the peak hold circuit 71 is entered into the negative polarity terminal of the comparator 72. The comparator 72 compares/calculates the power values of both input signals with each other, and outputs the control signal to a terminal 710.

In such a power comparing circuit 7, the maximum value of the filtered signal from the band-pass filter 6 is detected by the peak hold circuit 71 and then is outputted to the comparator 72. The comparator 72 inputs therein the signal (maximum value) from the peak hold circuit and the threshold value signal. When the power value indicative of the signal derived from the peak hold circuit 71 is larger than the power value representative of the threshold value signal, this comparator 72 outputs to the impedance converting circuit 8, such a control signal indicative of a power value corresponding to a difference between the power values indicative of both these signals.

It should be noted that the resistor 707 is employed so as to determine a discharge time constant of the peak hold circuit 71. Also, the switch 705 and the resistor 704 constitute a quick discharging path. That is, when the amplification factor of the power amplifying circuit 7 is varied in a stepwise manner, if the peak hold circuit 71 holds such a power maximum value of a signal produced based upon the signal outputted from the power amplifying circuit 7 by the previous amplification factor, then this peak hold circuit 71 outputs the control signal indicative of the erroneous voltage value. Therefore, this quick discharging path may prevent the output of this erroneous control signal.

Subsequently, operations of the transmit circuit represented in FIG. 1 will now be explained more in detail.

In FIG. 1, when the local signal is modulated based on the baseband transmit signal by the modulating circuit 1, the modulation signal is inputted into the power amplifying circuit 2. This modulation signal is power-amplified by the power amplifying circuit 2, and then the power-amplified signal is outputted to the directional coupling circuit 5. The power-amplified signal is outputted via the directional coupling circuit 5 and the impedance converting circuit 8 to the antenna 3. A portion of the power-amplified signal is branched at the directional coupling circuit 5 to the frequency mixing circuit 4.

On the other hand, the reflection waves produced in response to a change in the input impedances of the antenna 3 will be entered via the impedance converting circuit 8 and the directional coupling circuit 5 to the power amplifying circuit 2. As a result, the power amplifying circuit 2 can no longer power-amplify the modulation signal within the linear region. Accordingly, since the power amplifying circuit 2 power-amplifies the modulation signal in the nonlinear region, the spurious component is produced in the signal from the power amplifying circuit 2, so that the signal would be distorted.

When the distortion is produced, the frequency band component of the demodulation signal demodulated by the frequency mixing circuit 4 is broadened.

The broadened frequency band components of the demodulation signals in one case when the demodulation signal is distorted and in the other case when the demodulation signal is not distorted will now be explained with reference to FIG. 4 and FIG. 5.

Figure 4:
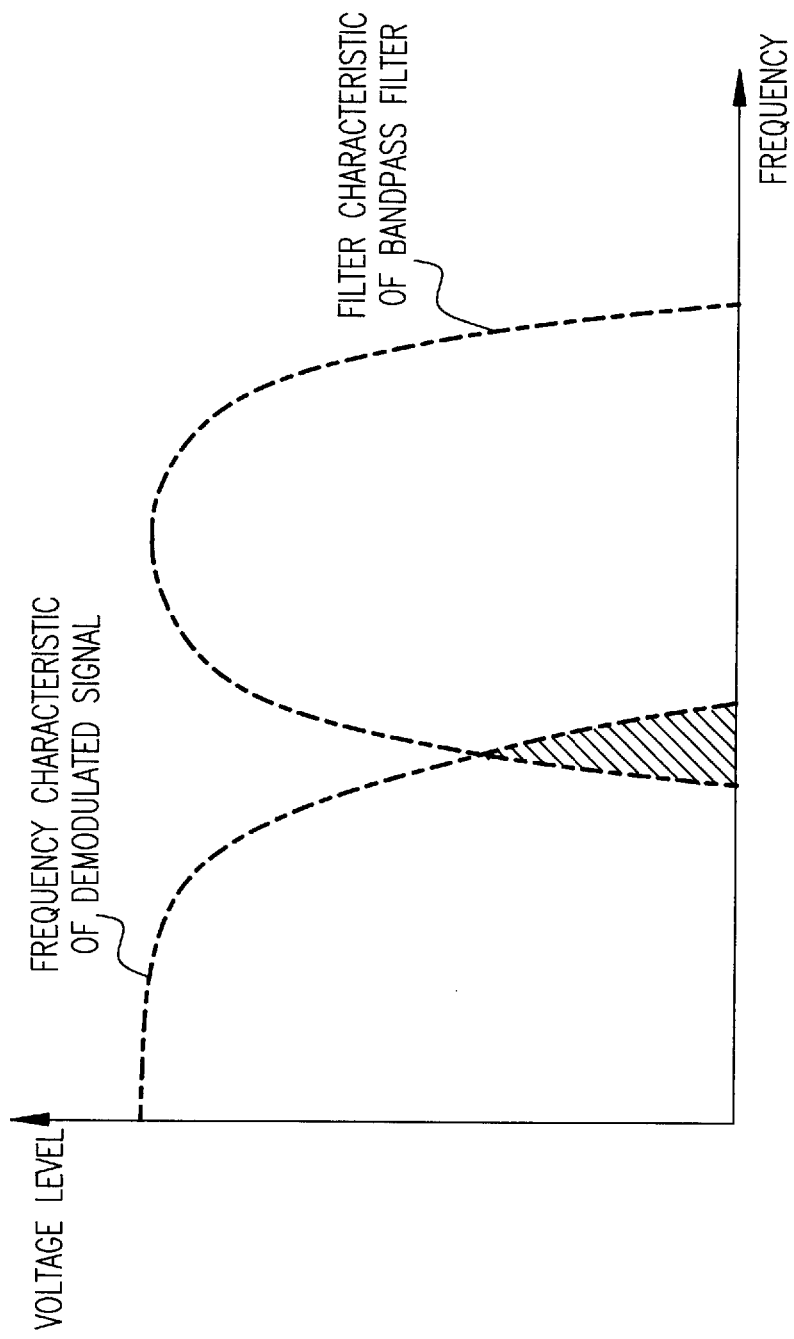
FIG. 4 is a graphic representation for showing a frequency characteristic of a demodulation signal and a filter characteristic of a band-pass filter when no distortion occurs.

First, FIG. 4 represents a frequency characteristic of the demodulation signal when the modulation signal is power-amplified in the linear region, and a filter characteristic diagram of the band-pass filter under this condition.

In FIG. 4, since the modulation signal has been power-amplified in the linear region, no spurious component is produced in the power-amplified modulation signal. At this time, no distortion occurs in the demodulation signal, and the signal component outside the frequency band thereof is not broadened.

When the band-pass filter 6 outputs the signal component of such a region as indicated by an inclined line, the power comparing circuit 7 detects that the power value of the output signal from this band-pass filter 6 is smaller than the power value indicative of a preselected threshold value signal, and outputs no control signal.

Figure 5:
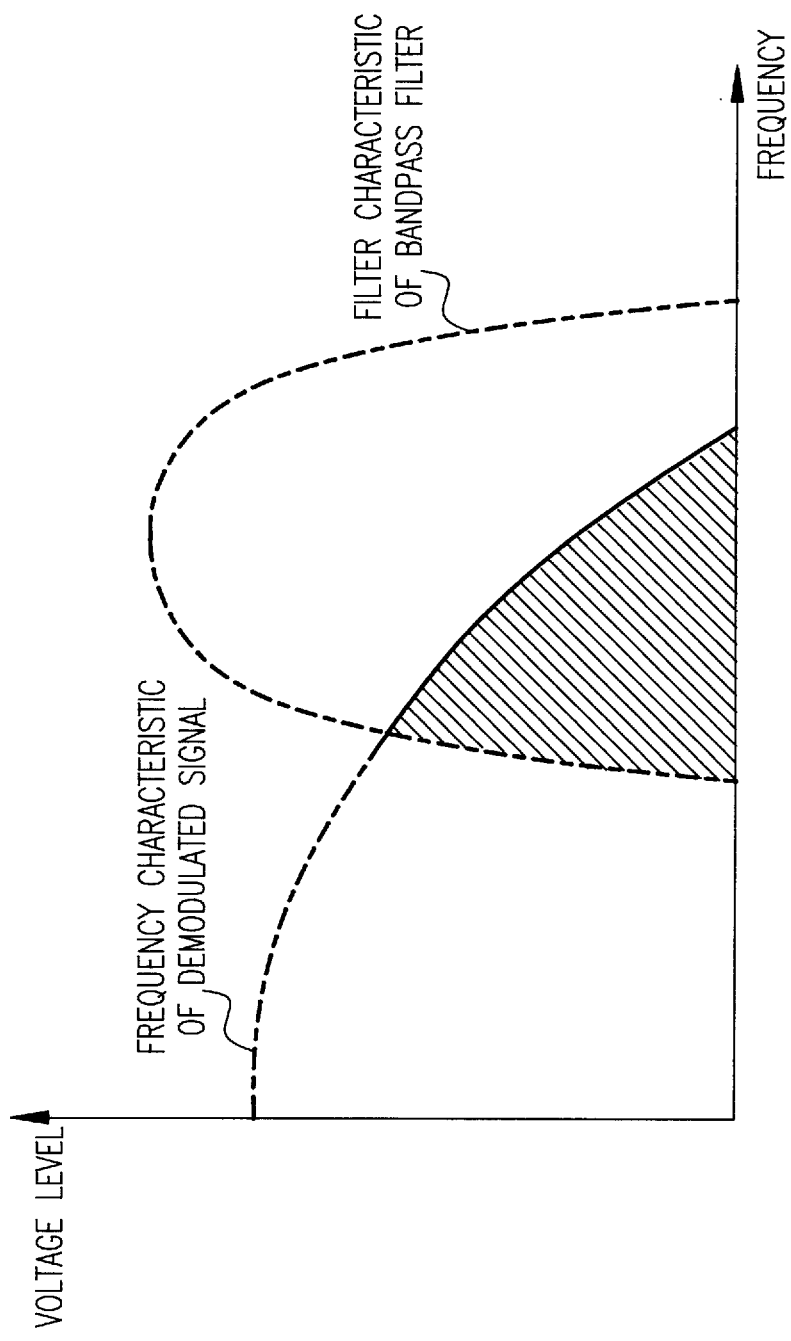
FIG. 5 is a graphic representation for showing a frequency characteristic of a demodulation signal and a filter characteristic of a band-pass filter when distortion occurs.

Then, in FIG. 5, there are shown a frequency characteristic of the distorted modulation signal, and a filter characteristic diagram thereof.

In FIG. 5, since the modulation signal has been power-amplified in the nonlinear region, the spurious component of the power-amplified modulation signal is produced. At this time, the demodulation signal is distorted, and the signal component outside the frequency range thereof is broadened.

When the band-pass filter 6 outputs the signal component of such a region as indicated by an inclined line, the power comparing circuit 7 detects that the power value of the output signal from this band-pass filter 6 is larger than the power value indicative of a predetermined threshold value, and thus outputs a control signal representative of a voltage value equal to a difference between the power values of both these signals.

Again, referring back to FIG. 1, when the power comparing circuit 7 outputs the control signal, this control signal is varied in such a manner that the impedance of the impedance converting circuit 8 may match the output impedance of the power amplifying circuit 2 with the input impedance of the antenna 3. As a consequence, the production of the reflection wave in the antenna 3 is stopped, so that it is possible to prevent the power amplifying circuit 2 from electrically being destroyed. Then, subsequently, the power amplifying circuit 2 can power-amplify the modulation signal in the linear region.

In the case that the amplification factor of the power amplifying circuit 2 is small and also the power value of the signal derived from the power amplifying circuit 2 is small, even when the modulation signal is power-amplified in the nonlinear region so that this modulation signal is distorted and thus the component outside the frequency band of the demodulation signal is greatly broadened, since the power value of the signal filtered from the band-pass filter 6 is small, the power comparing circuit 7 cannot detect the broadened component outside the frequency band of the demodulation signal. Accordingly, even when the reflection wave is produced in the antenna 3, the impedance converting circuit 8 cannot match the impedance of the power amplifying circuit 2 with the impedance of the antenna 3, so that the power amplifying circuit 2 would continuously power-amplify the modulation signal in the nonlinear region.

Figure 6:
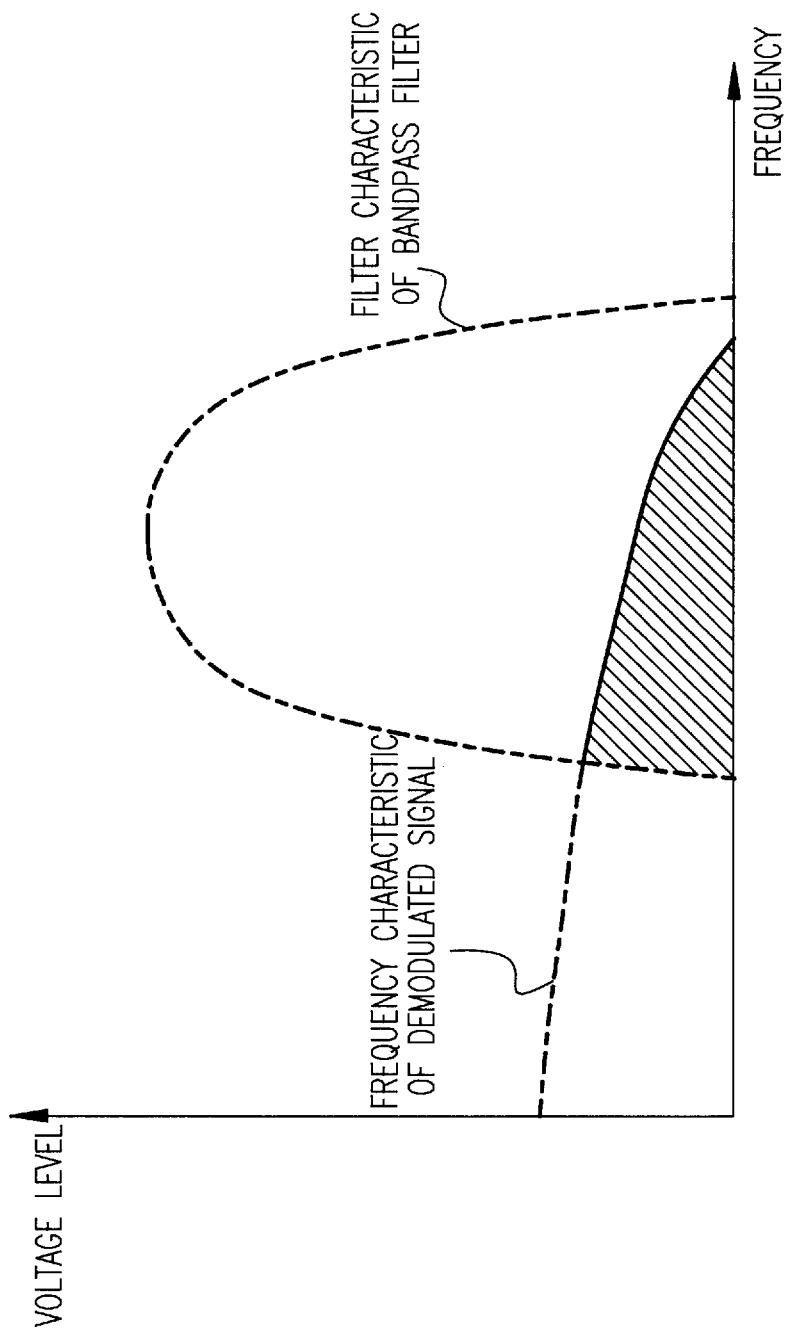
FIG. 6 is a graphic representation for showing a frequency characteristic of a demodulation signal and a filter characteristic of a band-pass filter when a power value of a power-amplified demodulation signal is small and low distortion occurs.

FIG. 6 indicates a frequency characteristic of the demodulation signal and a filter characteristic diagram of the band-pass filter when the distortion happens to occur in the case that the amplification factor of the power amplifying circuit is small.

In FIG. 6, since the spurious component is produced in the signal derived from the power amplifying circuit 2, the signal component outside the frequency band of the demodulation signal is broadened. When the band-pass filter 6 outputs the signal component of the region denoted by the inclined line, the power comparing circuit 7 detects that the power value of the signal outputted from the band-pass filter 6 is smaller than the power value indicative of a preselected threshold value, although the frequency band of the signal outputted from the band-pass filter 6 is largely broadened, since the power level of this signal is low. Then, the power comparing circuit 7 outputs no control signal.

Figure 7:
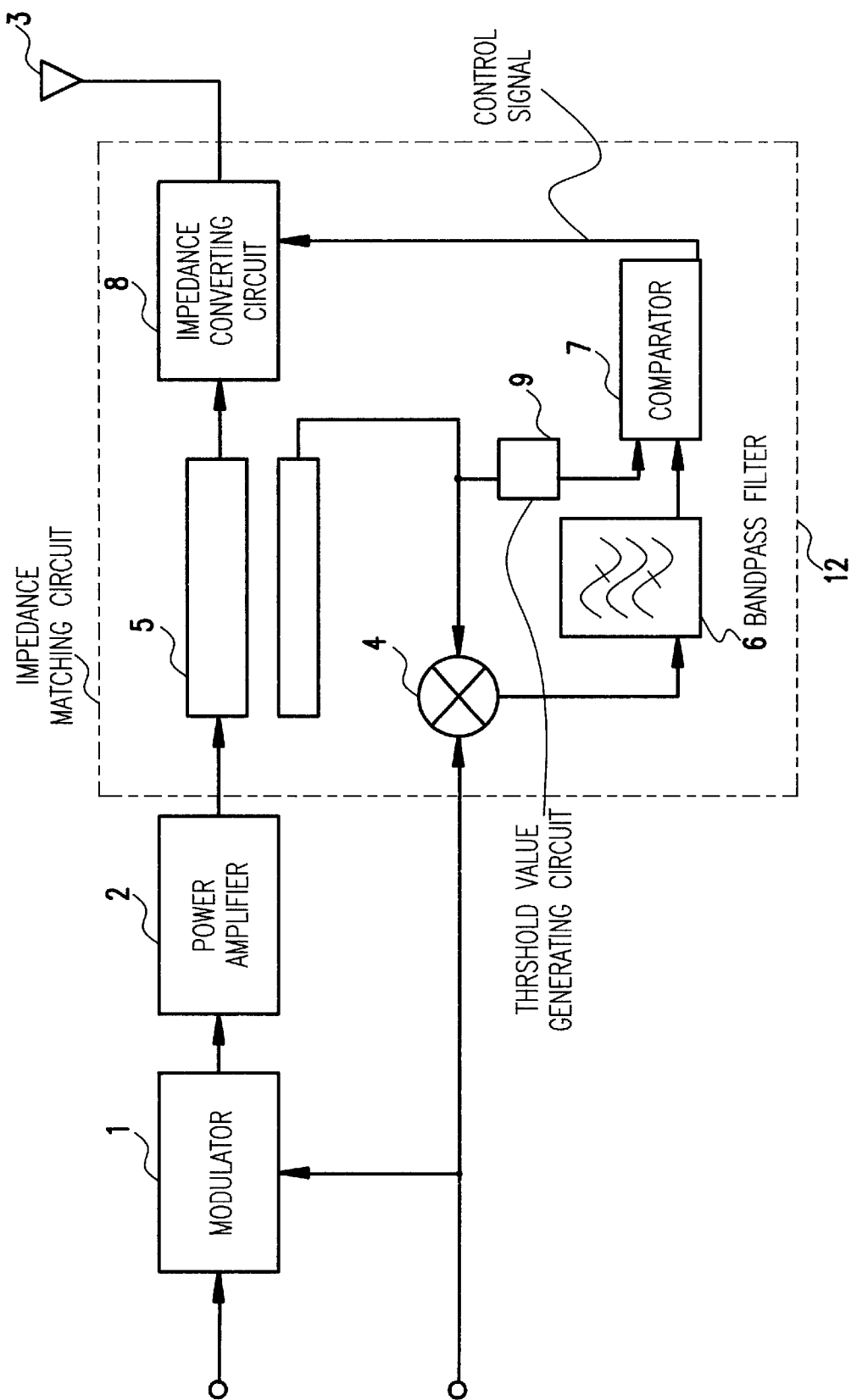
FIG. 7 is a functional block diagram for indicating an example of a transmitter circuit containing an impedance matching circuit according to another embodiment of the present invention.

As a means for solving the above-described inconvenient matter, another transmitter circuit containing an impedance matching circuit, according to another embodiment of the present invention, is represented in FIG. 7.

In FIG. 7, according to another embodiment, an impedance matching circuit 12 includes such a threshold value generating circuit 9 for inputting therein the output from the directional coupling circuit 5 and for outputting a threshold value signal to the power comparing circuit 7.

The threshold value generating circuit 9 outputs to the power comparing circuit 7, the threshold value signal indicative of such a power value proportional to the power value of the traveling wave detected by the directional coupling circuit 5.

It should be understood that the circuit arrangement other than this threshold value generating circuit 9, and also the operations thereof according to this embodiment are the same as those of the previously explained embodiment, the explanations thereof are omitted.

In this embodiment, since the power value indicative of the threshold value signal is varied based upon the power value of the signal derived from the power amplifying circuit 2, even when the amplification factor of the power amplifying circuit 2 is low, the power comparing circuit 7 can detect that the frequency band of the signal filtered from the bandpass filter 6 is greatly broadened, so that the input impedance of the antenna 3 can be matched with the output impedance of the power amplifying circuit 2.

As previously described, in accordance with the present invention, since the broadened frequency band of the power-amplified signal is detected to thereby match the input impedance of the antenna with the output impedance of the power amplifying circuit, the occurrence of the reflection wave in the antenna can be suppressed.

As a consequence, the power amplifying circuit can amplify the modulation signal within the linear region without being electrically destroyed.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. An impedance matching circuit in a transmitter circuit, comprising:

a modulator for modulating an input signal to output a modulation signal;

a power amplifier for power-amplifying said modulation signal, an antenna for outputting the signal power-amplified by said power amplifier;

a demodulator for demodulating the signal power-amplified by said power amplifier to output a demodulation signal;

a band-outside-component detector for detecting a band-outside-component of said demodulation signal, a controller for outputting a control signal based upon the signal derived from said band-outside-component detector; and an impedance matcher for matching an input impedance of said antenna with an impedance of said power amplifier by changing an impedance of said impedance matcher based upon said control signal.

2. An impedance matching circuit as claimed in claim 1, wherein said demodulator includes;

a signal detector for detecting a signal power-amplified by said power amplifier; and a frequency mixer for frequency-mixing the signal from said signal detector with a local signal employed when said modulator modulates said input signal.

3. An impedance matching circuit as claimed in claim 2, wherein said signal detector comprises a directional coupling circuit.

4. An impedance matching circuit according to claim 2, wherein said frequency-mixer mixes said signal power-amplified by said power amplifiers with said local signal, said local signal comprising a carrier signal of the frequency-mixer.

5. An impedance matching circuit as claimed in claim 1, wherein said band-outside-component detector comprises a band-pass filter.

6. An impedance matching circuit as claimed in claim 1, wherein said impedance matcher includes a variable capacitance diode whose capacitance diode is varied in response to said control signal.

7. An impedance matching circuit as claimed in claim 1, wherein said signal power-amplified by said power amplifier comprises a forward signal of said modulation signal.

8. An impedance matching circuit according to claim 1, wherein said signal power-amplified by said power amplifier is frequency-mixed with a local signal modulating input signal as a carrier signal.

9. An impedance matching circuit in a transmitter circuit, comprising:

a modulator for modulating an input signal to output a modulation signal;

a power amplifier for power-amplifying said modulation signal;

an antenna for outputting the signal power-amplified by said power amplifier;

a demodulator for demodulating the signal power-amplified by said power amplifier to output a demodulation signal;

a hand-outside-component detector for detecting a band-outside-component of said demodulation signal;

a controller for outputting a control signal based upon the signal derived from said band-outside-component detector; and an impedance matcher for matching an input impedance of said antenna with an impedance of said power amplifier by changing an impedance of said impedance matcher based upon said control signal.

wherein said controller compares a power output of the signal derived from said band-outside-component detector with a power value indicative of a predetermined threshold value signal, and outputs said control signal when the power value of the signal derived from said band-outside-component detector is larger than the power value indicative of said threshold value signal.

10. An impedance matching circuit as claimed in claim 9, wherein said controller includes:

a peak hold circuit for detecting a power value of the signal derived from said band-outside-component detector; and a comparator for comparing the power value of the signal derived value of the signal derived from said peak hold circuit with the power value indicated by said threshold value signal.

11. An impedance matching circuit as claimed in claim 10, wherein said impedance matcher includes:

first operational amplifier circuit for inputting the signal derived from said band-outside-component detector into a positive polarity terminal thereof, and for negatively feeding back an output signal thereto;

a diode for inputting the signal derived from said first operational amplifier circuit to a negative polarity terminal thereof;

a time constant circuit connected to a positive polarity terminal of said diode;

a resistor, one end of which is connected to the positive polarity terminal of said diode and the other end of which is connected to ground; and a second operational amplifier circuit for inputting the signal derived from the positive polarity terminal of said diode into a positive polarity terminal thereof, and for negatively feeding back an output signal thereof to the comparator.

12. An impedance matching circuit comprising:
a modulator for modulating an input signal to output a modulation signal;
a power amplifier for power-amplifying said modulation signal;
an antenna for outputting the signal power-amplified by said power amplifier;
a demodulator for demodulating the signal power-amplified by said power amplifier to output a demodulation signal;
a band-outside-component detector for detecting a band-outside-component of said demodulation signal;
a controller for outputting a control signal based upon the signal derived from said band-outside-component detector;
an impedance matcher for matching an input impedance of said antenna with an impedance of said power amplifier by changing an impedance of said impedance matcher based upon said control signal; and
a threshold value signal generator for generating a threshold value signal by calculating a power value of the signal derived from said power amplifier,
wherein said controller compares a power output of the signal derived from said band-outside-component detector with a power value indicative of a predetermined threshold value signal, and outputs said control signal when the power value of the signal derived from said band-outside-component detector is larger than the power value indicative of said threshold value signal.

13. An impedance matching circuit as claimed in claim 12, wherein said threshold value generator outputs a threshold value signal representative of a power value proportional to the power value of the signal derived from said power amplifier.

14. An impedance matching circuit in a transmitter unit, comprising:
a modulator for modulating an input signal to output a modulation signal;
a power amplifier for power-amplifying said modulation signal;
an antenna for outputting the signal power-amplified by said power amplifier;
a demodulator for demodulating the signal power-amplified by said power amplifier to output a demodulation signal;
a band-outside-component detector for detecting a band-outside-component of said demodulation signal;
a controller for outputting a control signal based upon the signal derived from said band-outside-component detector; and
an impedance matcher for matching an input impedance of said antenna with an impedance of said power amplifier by changing an impedance of said impedance matcher based upon said control signal, wherein said demodulator includes:
a signal detector for detecting a signal power-amplified by said power amplifier; and
a frequency mixer for frequency-mixing the signal from said signal detector with a local signal employed when said modulator modulates said input signal,
wherein said signal detector comprises a directional coupling circuit, and wherein said controller includes a peak hold circuit said peak hold circuit including:
a first coil, one end of which is connected to said directional coupling circuit and the other end of which is connected to said antenna;
a capacitor, one end of which is connected in parallel to the other end of said first coil;
a second coil, one end of which is connected in series to said controller and the other end of which is connected in parallel to said capacitor; and
a variable capacitance diode whose capacitance is varied by a voltage of said control signal by series-connecting an anode of said variable capacitance diode to said capacitor, and by connecting a cathode thereof to ground.

15. An impedance matching method in a transmitter circuit, having a method for modulating an input signal by a modulating circuit, a method for power-amplifying the modulated signal by a power amplifying circuit, and a method for transmitting the power-amplified signal, comprising steps of:
demodulating said power-amplified signal;
detecting a band-outside-component of the demodulated signal;
outputting a control signal based upon the detected band-outside-component; and
matching an input impedance of said antenna with an impedance of said power amplifying circuit by changing an impedance based upon said control signal.

16. A matching method as claimed in claim 15, wherein said demodulating step includes steps of:
detecting said power-amplified signal; and
frequency-mixing a local signal employed when said input signal is modulated with said detected power-amplified signal.

17. A matching method of according to claim 15, wherein said signal power-amplified by said power amplifying circuit comprises a forward signal of said modulated signal.

18. An impedance matching method in a transmitter circuit, having a method for modulating an input signal by a modulating circuit, a method for power-amplifying the modulated signal by a power amplifying circuit and a method for transmitting the power-amplified signal comprising steps of:
demodulating said power-amplified signal;
detecting a band-outside-component of the demodulated signal;
outputting a control signal based upon the detected band-outside-component; and
matching an input impedance of said antenna with an impedance of said power amplifying circuit by changing an impedance based upon said control signal,
wherein said matching step includes steps of:
comparing a power value of said detected band-outside-component with a power value indicative of a predetermined threshold value signal; and
outputting said control signal when the power value of said detected band-outside-component is larger than the power value indicative of said threshold value signal in said comparing step.

19. An impedance matching method in a transmitter circuit, having a method for modulating an input signal by a modulating circuit, a method for power-amplifying the modulated signal by a power amplifying circuit, and a method for transmitting the power-amplified signal, comprising steps of:

demodulating said power-amplified signal;

detecting a band-outside-component of the demodulated signal;

outputting a control signal based upon the detected band-outside-component;

matching an input impedance of said antenna with an impedance of said power amplifying circuit by changing an impedance based upon said control signal;

generating a threshold value by calculating the power value of said power-amplified signal;

comparing the power value of said detected band-outside-component with the power value indicative of said threshold value signal; and outputting said control signal when the power value of said detected band-output-component is larger than the power value indicative of said threshold value signal.

20. A matching method as claimed in claim 19, wherein in said threshold value signal generating step, a threshold value signal is produced which indicates a power value proportional to the power value of said power-amplified signal.

\* \* \* \* \*